US 7,898,932 B2

(12) United States Patent
Ichikura et al.

(10) Patent No.: US 7,898,932 B2
(45) Date of Patent: Mar. 1, 2011

(54) OPTICAL DISC RECORDING DEVICE AND OPTICAL DISC RECORDING SYSTEM

(75) Inventors: Takahiro Ichikura, Osaka (JP); Hiroyuki Yabuno, Osaka (JP)

(73) Assignee: Panasonic Corporation, Osaka (JP)

( * ) Notice: Subject to any disclaimer, the term of this patent is extended or adjusted under 35 U.S.C. 154(b) by 463 days.

(21) Appl. No.: 11/996,015

(22) PCT Filed: Jul. 18, 2006

(86) PCT No.: PCT/JP2006/314193
§ 371 (c)(1),
(2), (4) Date: Jan. 17, 2008

(87) PCT Pub. No.: WO2007/010906
PCT Pub. Date: Jan. 25, 2007

(65) Prior Publication Data
US 2009/0147665 A1 Jun. 11, 2009

(30) Foreign Application Priority Data
Jul. 19, 2005 (JP) ............................. 2005-208083

(51) Int. Cl.
*G11B 7/00* (2006.01)
(52) U.S. Cl. .................. 369/275.3; 369/116; 369/13.27; 369/47.53
(58) Field of Classification Search ... 369/275.1–275.4, 369/47.22, 47.23, 47.27, 47.31, 59.16, 175, 369/59.25; 360/72.2, 78.14
See application file for complete search history.

(56) References Cited

U.S. PATENT DOCUMENTS 5,495,463 A 2/1996 Akagi et al.

(Continued)

FOREIGN PATENT DOCUMENTS

JP 6-236576 8/1994

(Continued)

OTHER PUBLICATIONS

ECMA International, "120 mm and 80 mm DVD Rewritable Disk", Jun. 2005.*

(Continued)

*Primary Examiner*—Tan X Dinh
*Assistant Examiner*—Andrew J Sasinowski
(74) *Attorney, Agent, or Firm*—Wenderoth, Lind & Ponack, L.L.P.

(57) ABSTRACT

When recording is carried out in a DVD-RAM, if at least one address mark could have been detected at the header section, after a test light emission for a laser power control is carried out at a GAP section, normal recording is carried out from GUARD1. Herein, if the delay time in the reproduced data would have increased, and if the head of the GAP section has been passed by at the timing when the AM4 is detected in a period during judging whether the fourth AM has been detected or not, it would not be possible to carry out a test light emission normally at the GAP section. In an optical disc recording device of the present invention, when any of the first to third address marks could have been detected, a test light emission is carried out at the GAP section as conventional, and normal recording is carried out from GUARD1 with controlling the laser powers on the basis of that result. When only AM4 could have been detected, the test light emission is not carried out and normal recording from GUARD1 is carried out.

14 Claims, 12 Drawing Sheets

U.S. PATENT DOCUMENTS

| | | | |
|---|---|---|---|
| 6,160,779 | A | 12/2000 | Usui et al. |
| 6,636,467 | B1 * | 10/2003 | Taussig .................... 369/47.3 |
| 6,975,570 | B1 | 12/2005 | Gushima et al. |
| 2004/0202083 | A1 * | 10/2004 | Ogawa et al. ............ 369/59.25 |
| 2005/0276191 | A1 * | 12/2005 | Kashihara et al. .......... 369/53.2 |

FOREIGN PATENT DOCUMENTS

| | | |
|---|---|---|
| JP | 8-255439 | 10/1996 |
| JP | 11-120691 | 4/1999 |
| WO | 01/09890 | 2/2001 |

OTHER PUBLICATIONS

International Search Report issued Nov. 7, 2006 in the International (PCT) Application No. PCT/JP2006/314193.

Written Opinion of the ISA issued Nov. 7, 2006 in the International (PCT) Application No. PCT/JP2006/314193.

International Preliminary Report on Patentability issued Aug. 29, 2007 in the International (PCT) Application No. PCT/JP2006/314193.

* cited by examiner

OPTICAL DISC RECORDING DEVICE AND OPTICAL DISC RECORDING SYSTEM

TECHNICAL FIELD

The present invention relates to an optical disc recording device and an optical disc recording system.

BACKGROUND ART

The sector structure in a generalized DVD-RAM is shown in FIG. 1.

As shown in FIG. 1, a header region consists of an address region of 128 bytes and a mirror region of 2 bytes, and the data recording region consists of a gap region of (10+J/16) bytes, a guard 1 region of (20+k) bytes, a data VFO region of 35 bytes, a pre-sink code region of 3 bytes, a data region of 2418 bytes, a data post-amble region of 1 byte, a guard 2 region of (55-k) bytes, and a buffer region of (25-J/16) bytes. A sector (2697 bytes) consists of the above-described header region and the data recording region.

Further, the address region consists of a VFO1 region of 36 bytes, an AM1 region of 3 bytes, a PID1 region of 4 bytes, an IED1 region of 2 bytes, a PA1 region of 1 byte, and further an address region 2, an address region 3, and an address region 4 having the same constructions as described above.

When recording is to be performed in the optical disc recording device which has a sector structure of DVD-RAM as shown in FIG. 1, an address mark which is written in into the header section is intended to be detected and even only one address mark could have been detected at the header section, the recording is carried out using the timing of having detected the address mark as a reference (for example, in patent document 1). When the recording is actually carried out, in order to determine the irradiation power of laser pulses, recording of test recording data (i.e., test light emission) is carried out at the GAP section (for example, in patent document 2).

FIG. 3 is a block diagram illustrating a construction of a conventional disc recording device 1300, shown in patent document 1. In the figure, reference numeral 301 denotes an optical disc, numeral 302 denotes a disc motor, numeral 303 denotes an optical pickup, numeral 304 denotes an amplifier, numeral 305 denotes a servo circuit, numeral 306 denotes a reproduced signal processing unit, numeral 311 denotes an address mark detection unit, numeral 312 denotes a demodulation unit, numeral 313 denotes an address error detection unit, numeral 314 denotes a timing generation unit, numeral 315 denotes a modulation unit, numeral 307 denotes a format encoder/decoder, numeral 308 denotes a laser driving unit, and numeral 310 denotes a system controller. Patent document 1: The International Publication No. 01/009890 pamphlet Patent document 2: Japanese Published Patent Application No. 6-236576 official gazette

SUMMARY OF THE INVENTION

Problems to be Solved by the Invention

In the above conventional optical disc recording device, the reproduced data should have a delay due to the PRML processing or filtering processing up until reaching the address mark detection circuit, and particularly, the increase in the delay amount should become eminent at a high multiple speed operation.

If it is judged as to whether the fourth address mark could have been detected or not when the delay time in the reproduced data is increased as shown in FIG. 2, it would become a situation such that the head of the GAP section has already been passed by at a timing when the fourth address mark is detected. This results in that it is not possible to carry out a normal test light emission at the GAP section as in the conventional method.

The present invention is directed to solving the above-described problems and has for its object to provide an optical disc recording device that can carry out a normal test light emission even when the delay time in the reproduced data should increase.

Measures to Solve the Problems

In order to solve the above-described problems, according to a first aspect of the present invention, there is provided an optical disc recording device in which, there is provided a sector structure consisting of an address region at which address information is previously recorded and a data recording region for recording data, the header region consisting of plural address regions, the address information consisting of an address mark section at which an address mark indicating the start of the address information is recorded and an address section for recording addresses, the data recording region consisting of a first recorded data non-referring region, a recorded data referring region, and a second recorded data non-referring region, and the data recording into the data recording region being carried out by irradiating laser pulses to the data recording region in the optical disc, comprising, an address mark detecting means for detecting the address mark which is recorded in the address mark section of a particular sector, a data recording determining means for determining the period for recording data into to the data recording region of the particular sector on the basis of the timings of having detected the address marks, a test light emission pattern generating means for generating test recording data for determining the irradiation pattern of laser pulses in the first recorded data non-referring region, and a data recording means for recording data into the recorded data referring region, wherein whether the test recording data is to be outputted in the test light emission pattern generating means or not is selected according to the situations of the address mark detection as detected by the address mark detection means before recording data by the data recording means.

According to a second aspect of the present invention, there is provided an optical disc recording device as defined in the first aspect of the present invention, wherein the optical disc is a DVD-RAM, the first recorded data non-referring region is a GAP region, the recorded data referring region is a region from GUARD1 region up to GUARD2 region, and the second recorded data non-referring region is a BUFFER region.

According to a third aspect of the present invention, there is provided an optical disc recording device in which, there is provided a sector structure consisting of an address region at which address information is previously recorded and a data recording region for recording data, the header region consisting of plural address regions, the address information consisting of an address mark section at which an address mark indicating the start of address information is recorded and an address section for recording addresses, the data recording region consisting of a first recorded data non-referring region, a recorded data referring region, and a second recorded data non-referring region, and the data recording into the data recording region being carried out by irradiating laser pulses to the data recording region in the optical disc, comprising: an address mark detecting means for detecting the address mark which is recorded in the address mark section of a particular sector, a data recording determining means for determining the period for recording data into to the data recording region of the particular sector on the basis of the timings of having detected the address marks, a test light emission pattern generating means for generating test recording data for determining the irradiation power of laser pulses in the first recorded data non-referring region, and a data recording means for recording data into the recorded data referring region, wherein the test light emission pattern generating means delays the output position of the test recording data according to the situations of the address mark detection as detected by the address mark detection means before recording data by the data recording means.

According to a fourth aspect of the present invention, there is provided an optical disc recording device as defined in the third aspect of the present invention, wherein the test light emission pattern generating means can change the output position of the test recording data which should be delayed according to settings.

According to a fifth aspect of the present invention, there is provided an optical disc recording device as defined in the third aspect of the present invention, wherein the optical disc is a DVD-RAM, the first recorded data non-referring region is a GAP region, the recorded data referring region is a region from GUARD1 region to GUARD2 region, and the second recorded data non-referring region is a BUFFER region.

According to a sixth aspect of the present invention, there is provided an optical disc recording device in which there is provided a sector structure consisting of an address region in which an address information is previously recorded and a data recording region for recording data, the header region consisting of plural address regions, the address information consisting of an address mark section at which an address mark indicating the start of the address information is recorded and an address section for recording addresses, the data recording region consisting of a first recorded data non-referring region, a recorded data referring region, and a second recorded data non-referring region, and the data recording into the data recording region being carried out by irradiating laser pulses to the data recording region in the optical disc, comprising, an address mark detecting means for detecting the address mark which is recorded in the address mark section of a particular sector, a data recording determining means for determining the period for recording data into the data recording region of the particular sector on the basis of the timings of having detected the address marks, a test light emission pattern generating means for generating test recording data for determining the irradiation power of laser pulses in the first recorded data non-referring region, and a data recording means for recording data into the recorded data referring region, wherein the test light emission pattern that is generated in the test light emission pattern generating means is emitted in approximately the same width which is not dependent on the linear velocity.

According to a seventh aspect of the present invention, there is provided a light source device as defined in the sixth aspect of the present invention, wherein, the optical disc is a DVD-RAM, the first recorded data non-referring region is a GAP region, the recorded data referring region is a region from GUARD1 region to GUARD2 region, the second recorded data non-referring region is a BUFFER region.

According to an eighth aspect of the present invention, there is provided an optical disc recording device in which there is provided a sector structure consisting of an address region in which an address information is previously recorded and a data recording region for recording data, the header region consisting of plural address regions, the address information consisting of an address mark section at which an address mark indicating the start of the address information is recorded and an address section for recording addresses, the data recording region consisting of a first recorded data non-referring region, a recorded data referring region, and a second recorded data non-referring region, and the data recording into the data recording region being carried out by irradiating laser pulses to the data recording region in the optical disc, comprising, four address information being provided as the address information, an address mark detecting means for detecting the address mark which is recorded in the address mark section of a particular sector, a data recording determining means for determining the data recording period to the data recording region of the particular sector on the basis of the timings of having detected the address marks, a test light emission pattern generating means for generating test recording data for determining the irradiation power of the laser pulses in the first recorded data non-referring region, a data recording means for recording data into the recorded data referring region, and the data recording determining means determining the data recording period on the basis of the timing of having detected the fourth address mark when the first to third address marks could not have been detected.

According to a ninth aspect of the present invention, there is provided an optical disc recording system as defined in the eighth aspect of the present invention, wherein the data recording determining means determines the period for recording the data according to either of the timings of having detected any of the first to third address marks.

According to a tenth aspect of the present invention, there is provided an optical disc recording device as defined in the eighth aspect of the present invention, wherein the optical disc is a DVD-RAM, the first recorded data non-referring region is a GAP region, the recorded data referring region is a region from GUARD1 region up to GUARD2 region, and the second recorded data non-referring region is a BUFFER region.

According to a eleventh aspect of the present invention, there is provided an optical disc recording system in which, there is provided a sector structure consisting of an address region at which address information is previously recorded and a data recording region for recording data, the header region consisting of plural address information, the address information consisting of an address mark section at which an address mark indicating the start of the address information is recorded and an address section for recording addresses, the data recording region consisting of a first recorded data non-referring region, a recorded data referring region, and a second recorded data non-referring region, and the data recording into the data recording region being carried out by irradiating laser pulses to the data recording region in the optical disc, comprising an address mark detecting means for detecting the address mark which is recorded in the address mark section of a particular sector, a data recording determining means for determining the period for recording data to the data recording region of the particular sector on the basis of the timings of having detected the address marks, a test light emission pattern generating means for generating test recording data for determining the irradiation power of the laser pulses in the first recorded data non-referring region, a data recording means for recording data into the recorded data referring region, the test light emission pattern generating means selecting whether the test recording data is to be outputted or not in accordance with the situations of having detected the address marks as detected by the address mark detection means before data recording by the data recording means is performed, and when the test recording data are not outputted successively for a predetermined number of times, the recording is halted.

According to a twelfth aspect of the present invention, there is provided an optical disc recording system as defined in the eleventh aspect of the present invention, wherein the optical disc is a DVD-RAM, the first recorded data non-referring region is a GAP region, the recorded data referring region is a region from GUARD1 region up to GUARD2 region, and the second recorded data non-referring region is a BUFFER region.

EFFECTS OF THE INVENTION

According to an optical disc recording device of the present invention, there is provided a sector structure consisting of an address region at which address information is previously recorded and a data recording region for recording data, the header region consisting of plural address regions, the address information consisting of an address mark section at which an address mark indicating the start of the address information is recorded and an address section for recording addresses, the data recording region consisting of a first recorded data non-referring region, a recorded data referring region, and a second recorded data non-referring region, and the data recording into the data recording region being carried out by irradiating laser pulses to the data recording region in the optical disc, and comprising an address mark detecting means for detecting the address mark which is recorded in the address mark section of a particular sector, a data recording determining means for determining the period for recording data to the data recording region of a particular sector on the basis of the timings of having detected the address marks, a test light emission pattern generating means for generating test recording data for determining the irradiation power of the laser pulses in the first recorded data non-referring region, and a data recording means for recording data into the recorded data referring region, wherein whether the test recording data is to be outputted in the test light emission pattern generating means or not is selected in accordance with the situations of having detected the address marks as detected by the address mark detection means before recording data by the data recording means. Therefore, even when in performing recording in a DVD-RAM, the delay time in the reproduced data increases and the fourth address mark could not have been detected up to the top of the GAP section, if even only one among the first to third address marks could be detected, the normal data recording can be accomplished, after the test light emission in the GAP section is carried out as is conventional.

Further, if only the fourth address mark could have been detected, only the normal data recording can be carried out.

Therefore, in the usual data recording, if even only one among the four address marks could have been detected, the normal data recording can be carried out, and there would result in no increase in the probability that the recording would fail, as compared with the conventional.

Further, while there may be a case where it is impossible to carry out a laser power control for each sector at the top of the sector at which recording is intended, since there would occur no variations in the laser characteristics in the period of several sectors even in such cases, the recording in DVD-RAM can be carried out without occurring deteriorations in the recording performance.

According to an optical recording device of the present invention, there is provided a sector structure consisting of an address region at which address information is previously recorded and a data recording region for recording data, the header region consisting of plural address regions, the address information consisting of an address mark section at which an address mark indicating the start of the address information is recorded and an address section for recording addresses, the data recording region consisting of a first recorded data non-referring region, a recorded data referring region, and a second recorded data non-referring region, and the data recording into the data recording region being carried out by irradiating laser pulses to the data recording region in the optical disc, and comprising an address mark detecting means for detecting the address mark which is recorded in the address mark section of a particular sector, a data recording determining means for determining the period for recording data to the data recording region of the particular sector on the basis of the timings of having detected the address marks, a test light emission pattern generating means for generating test recording data for determining the irradiation power of the laser pulses in the first recorded data non-referring region, and a data recording means for recording data into the recorded data referring region, wherein the test light emission pattern generating means delays the output position of the test recording data according to the situations of having detected the address marks as detected by the test light emission pattern generating means before recording data by the data recording means.

Therefore, even when the delay time in the reproduced data increases and the fourth address mark could not have been detected up to the top of the GAP section in recording in DVD-RAM, if any of the first to third address marks could have been detected, the normal data recording can be accomplished after the test light emission in the GAP section is carried out as is conventional.

Further, if only the fourth address mark could have been detected, only the normal data recording can be carried out after the test light emission has been carried out at a position that is delayed with relative to the normal.

Therefore, it is possible to carry out recording of a DVD-RAM without deteriorating the performance with relative to as in the conventional.

According to an optical disc recording device of the present invention, there is provided a sector structure consisting of an address region at which address information is previously recorded and a data recording region for recording data, the header region consisting of plural address information, the address information consisting of an address mark section at which an address mark indicating the start of the address information is recorded and an address section for recording addresses, the data recording region consisting of a first recorded data non-referring region, a recorded data referring region, and a second recorded data non-referring region, and the data recording into the data recording region being carried out by irradiating laser pulses to the data recording region in the optical disc, and comprising an address mark detecting means for detecting the address mark which is recorded in the address mark section of a particular sector, a data recording determining means for determining the period for recording data to the data recording region of a particular sector on the basis of the timings of having detected the address marks, a test light emission pattern generating means for generating test recording data for determining the irradiation power of the laser pulses in the first recorded data non-referring region, and a data recording means for recording data into the recorded data referring region, wherein the test light emission pattern that is generated in the test light emission pattern generating means is outputted in approximately the same width that is not dependent on the linear velocity. Therefore, it is possible to always carry out a laser power learning at the same precision even in performing recording that does not have a constant linear velocity, such as in CAV recording.

According to an optical disc recording device of the present invention, there is provided a sector structure consisting of an address region at which address information is previously recorded and a data recording region for recording data, the header region consisting of plural address regions, the address information consisting of an address mark section at which an address mark indicating the start of the address information is recorded and an address section for recording addresses, the data recording region consisting of a first recorded data non-referring region, a recorded data referring region, and a second recorded data non-referring region, and the data recording into the data recording region being carried out by irradiating laser pulses to the data recording region in the optical disc, and, being provided with an address mark detecting means for detecting the address mark which is recorded in the address mark section of a particular sector, a data recording determining means for determining the period for recording data to the data recording region of the particular sector on the basis of the timings of having detected the address marks, a test light emission pattern generating means for generating test recording data for determining the irradiation power of the laser pulses in the first recorded data non-referring region, and a data recording means for recording data into the recorded data referring region, and the data recording determining means does not determine on the basis of the timings of having detected the fourth address mark when any of the first to third address marks could have been detected. Therefore, in the recording of DVD-RAM that carries out normal data recording after the test light emission is carried out at the GAP section, even when the delay in reproduced data increases and the fourth address mark could not have been detected up to the top of the GAP section, if any of the first to third address marks could have been detected, it is possible to carry out recording of DVD-RAM that carries out normal data recording after the test light emission is carried out at the GAP section without affecting unfavorable influences on the test light emission by that the fourth address mark could have been detected.

According to an optical disc recording system of the present invention, there is provided a sector structure consisting of an address region at which address information is previously recorded and a data recording region for recording data, the header region consisting of plural address regions, the address information consisting of an address mark section at which an address mark indicating the start of the address information is recorded and an address section for recording addresses, the data recording region consisting of a first recorded data non-referring region, a recorded data referring region, and a second recorded data non-referring region, and the data recording into the data recording region being carried out by irradiating laser pulses to the data recording region in the optical disc, and comprising an address mark detecting means for detecting the address mark which is recorded in the address mark section of a particular sector, a data recording determining means for determining the period for recording data to the data recording region of the particular sector on the basis of the timings of having detected the address marks, a test light emission pattern generating means for generating test recording data for determining the irradiation power of the laser pulses in the first recorded data non-referring region, and a data recording means for recording data into the recorded data referring region, and the test light emission pattern generating means selecting whether the test recording data is to be outputted or not in accordance with the situations of having detected the address marks as detected by the address mark detection means before the data are recorded by the data recording means, wherein when the test recording data are not outputted successively for a predetermined number of times, the recording is halted. Therefore, it is possible to prevent the system from carrying out recording of DVD-RAM with being in a state as it is where the control of the laser power is not being performed correctly.

DESCRIPTION OF REFERENCE NUMERALS

Figure 1:
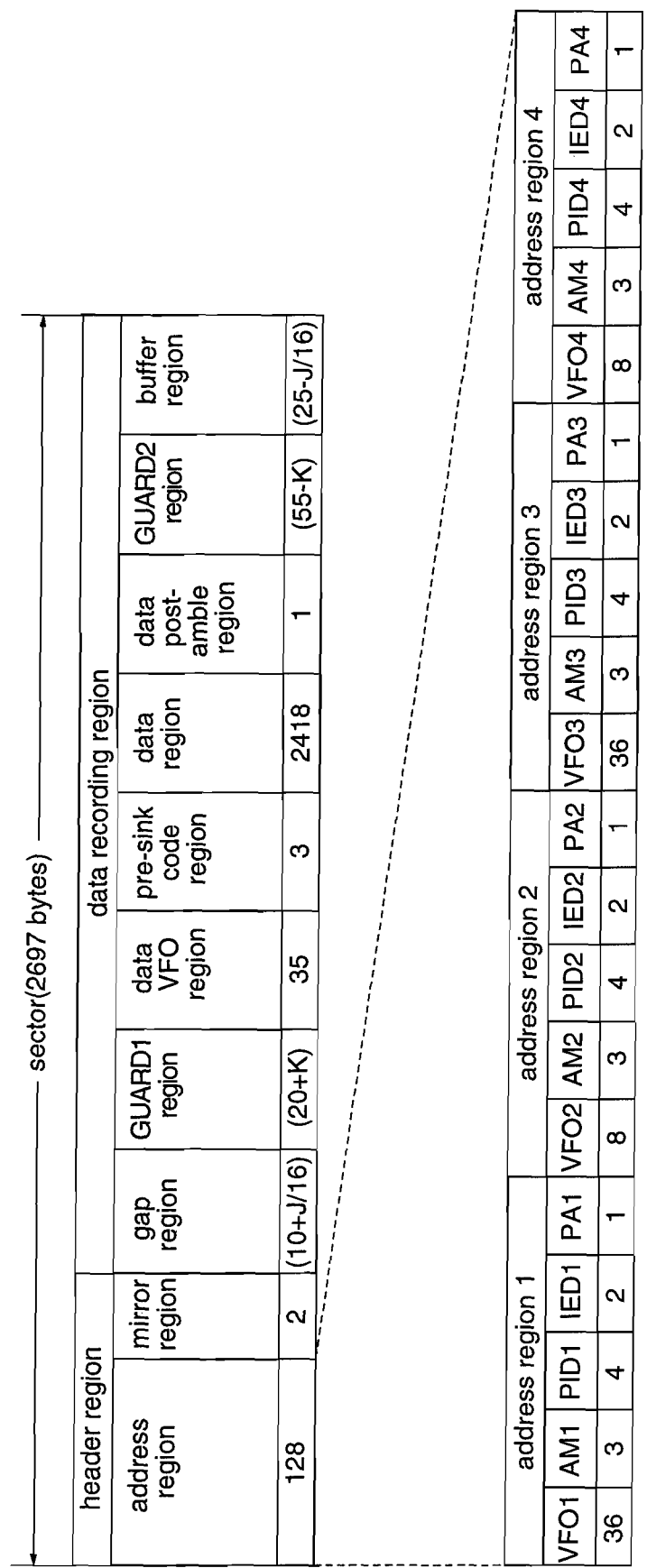
FIG. 1 is a diagram illustrating a sector structure of a common DVD-RAM.
Figure 2:
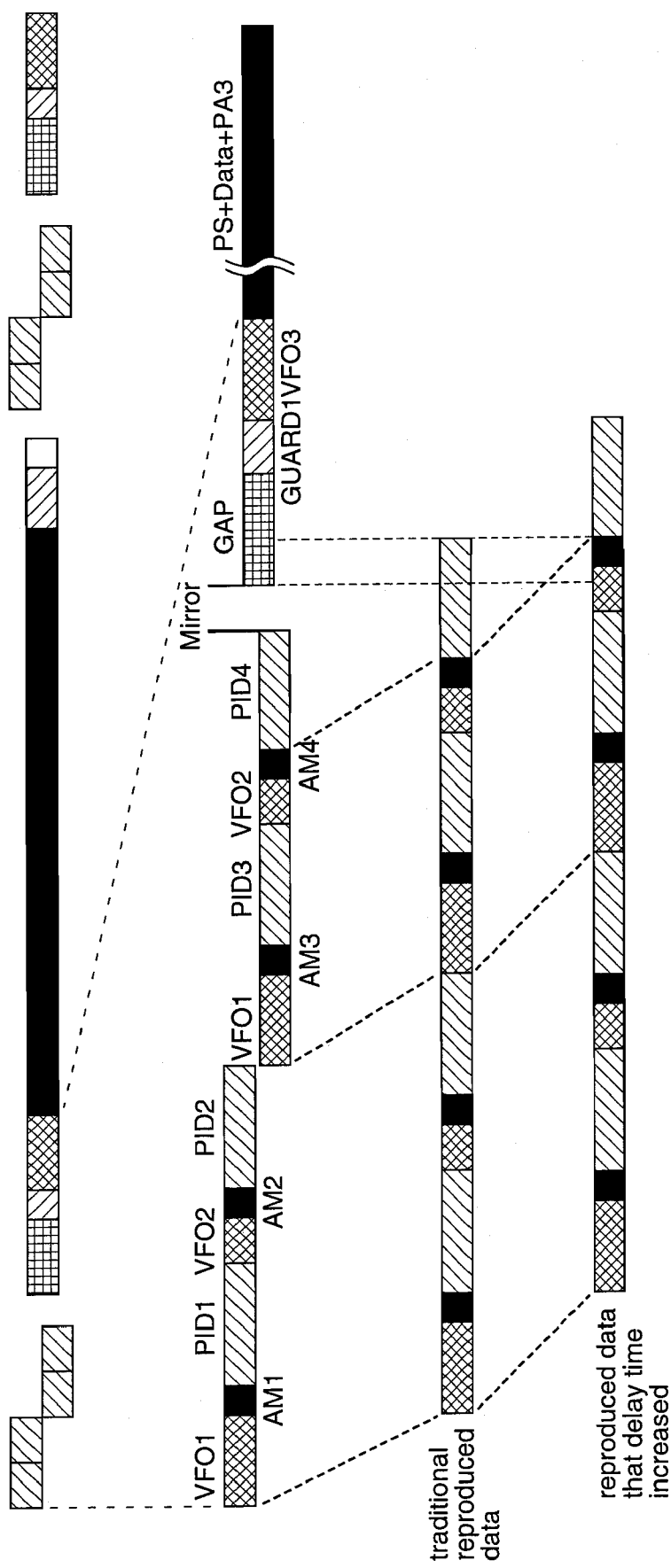
FIG. 2 is a timing chart illustrating the reproduced data in the conventional and a case where the delay time in the reproduced data is increased in a reproduction in DVD-RAM.

301,401,801 . . . optical disc
302,402,802 . . . disc motor
303,403,803 . . . optical pickup
304,404,804 . . . amplifier
305,405,805 . . . servo circuit
306,406,806 . . . reproduced signal processing part
307,407,807 . . . a format encoder/decoder
308,408,808 . . . laser driving part
309,409,809 . . . host interface 310,410,810 . . . system controller
311,411,811 . . . address mark detection part
312,412,812 . . . demodulation part
313,413,813 . . . address error detection part
314,414,814 . . . timing generation part
315,415,815 . . . modulation part
416 . . . address mark detection situation judging part
417,816 . . . test recording data generation part

DETAILED DESCRIPTION OF THE INVENTION

First Embodiment

Hereinafter, an optical disc recording device according to a first embodiment of the present invention will be described.

Figure 4:
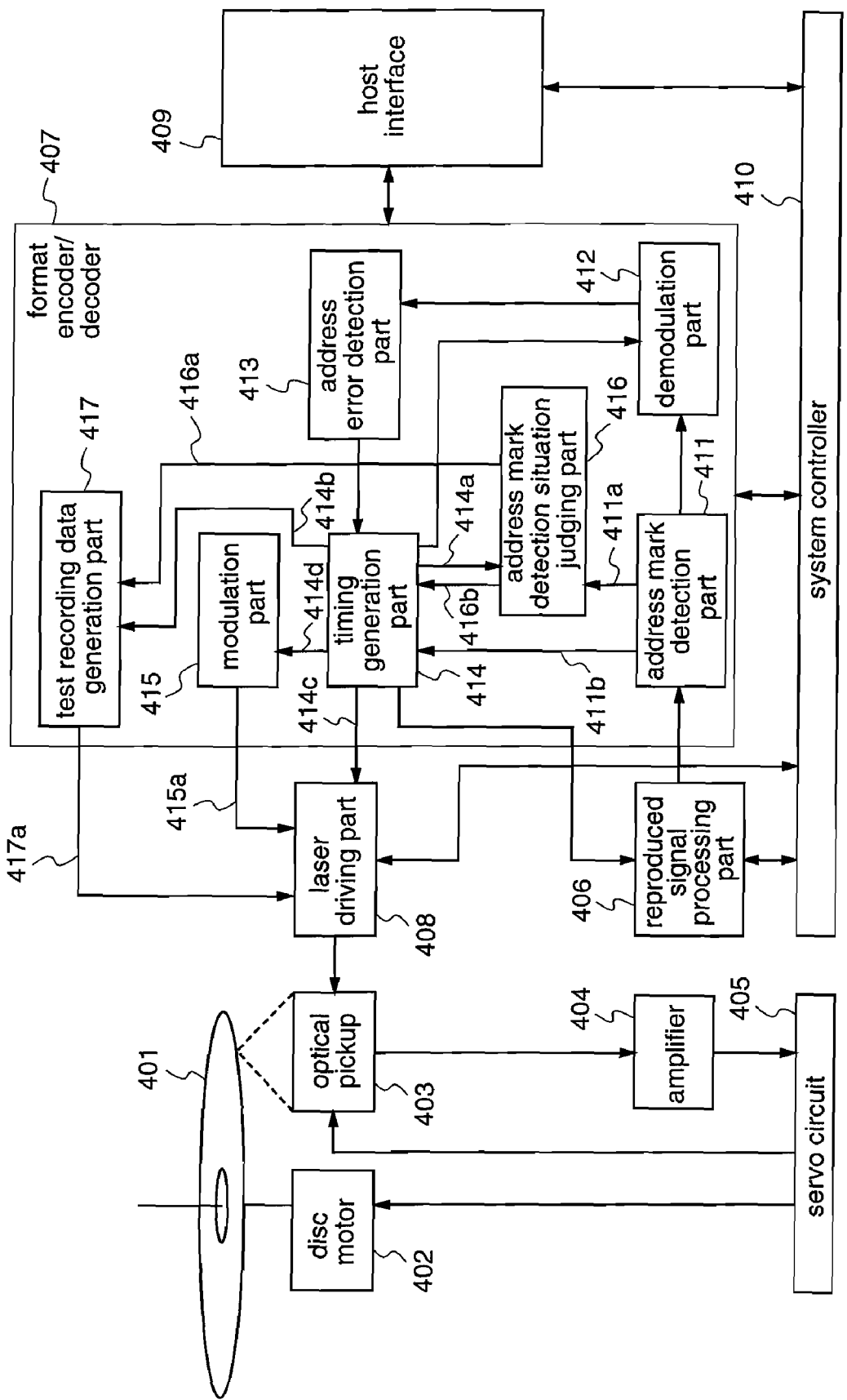
FIG. 4 is a block diagram illustrating a construction of an optical disc recording device 1000, 2000, and 4000 according to the first, second, and fourth embodiments of the present invention.

FIG. 4 is a diagram illustrating an optical disc recording device 1000 according to a first embodiment of the present invention. The optical disc recording device 1000 according to this first embodiment carries out test light emission and normal recording when the address marks AM1 to AM3 could be read, and carries out only normal recording when only the address mark AM4 could be read.

Figure 3:
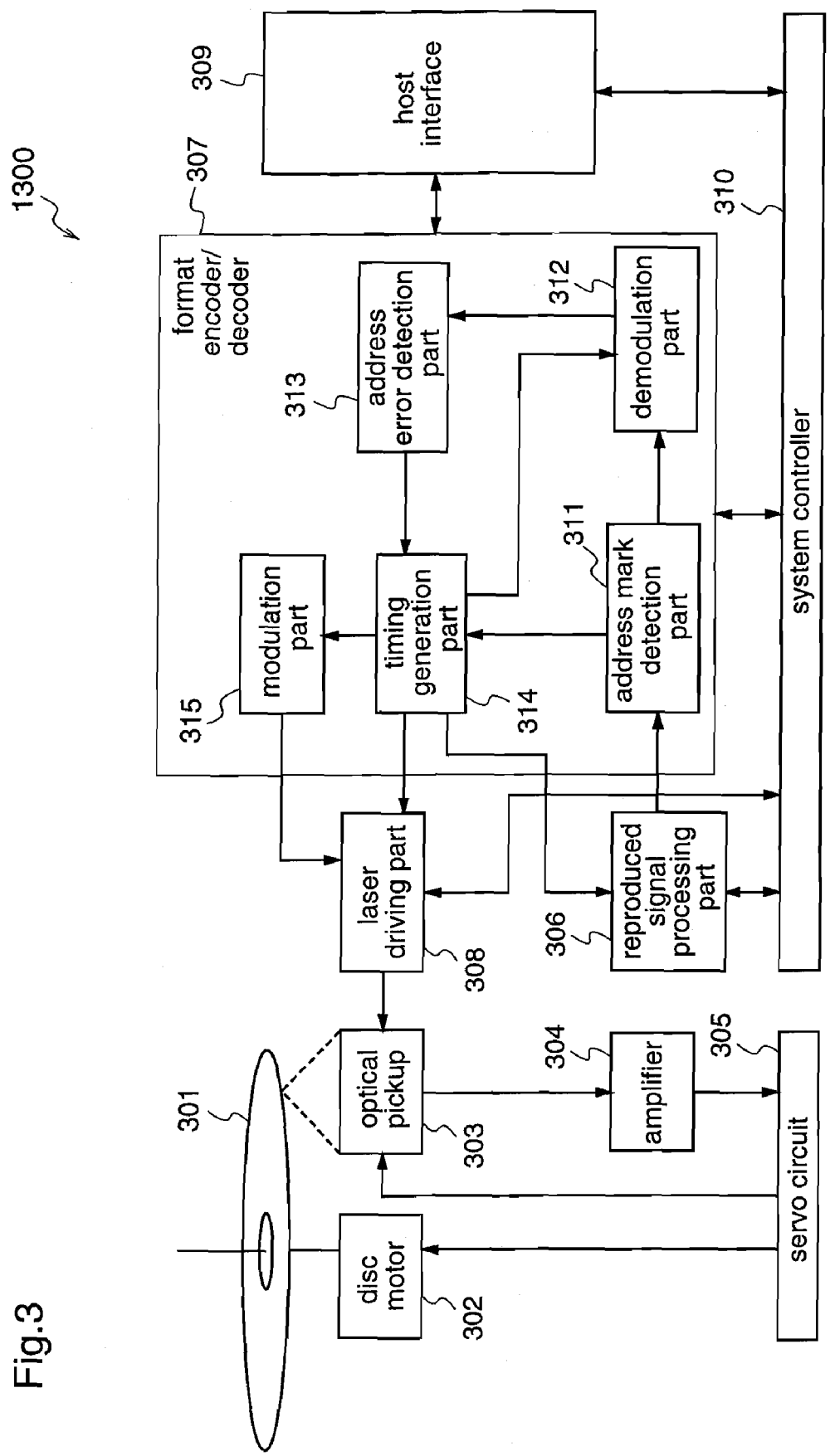
FIG. 3 is a block diagram illustrating a construction of a conventional optical disc recording device 1300 which is shown in the patent document 1.

In FIG. 4, the respective constitutional elements from the optical disc 401 to the modulation unit 415 are the same as the respective constitutional elements from the optical disc 301 to the modulation unit 315 in the optical disc recording device 1300 shown in FIG. 3 that is disclosed in patent document 1.

The address mark detection situation judging part 416 judges the situations of having detected the address marks of the present sector on the basis of the address mark detection signal AMDET (411a) which is detected by the address mark detection part 411 and the address mark detection window AMWIN (414a) which is generated by the timing generation part 414, and outputs a signal AMOKFLG (416a) indicating the situations of having detected the address marks to the test recording data generation part 417.

The test recording data generation part 417 determines the position of the test light emission region from the timing signal 414b which is outputted from the timing generation part 414, and determines as to whether the test recording data is to be outputted or not dependent on the address mark detection situation signal AMOKFLG (416a) which was outputted from the address mark detection situation judging part 416, and outputs the test recording data TST_WTDT (417a) to the laser driving control part 408.

The address mark detection part 411 also outputs the address mark detection signal 411b to the timing generation part 414, and the address mark detection situation judging part 416 also outputs the address mark detection situation signal 416b to the timing generation part 414. The timing generation part 414 also outputs the data 414d from the address error detection part 413 to the modulation part 415, and also outputs the WTGT signal (414c) indicating the data recording position to the laser driving part 408.

An operation of the optical disc recording device 1000 according to the first embodiment of the present invention will be described for a case where an optical disc is DVD-RAM.

Figure 5:
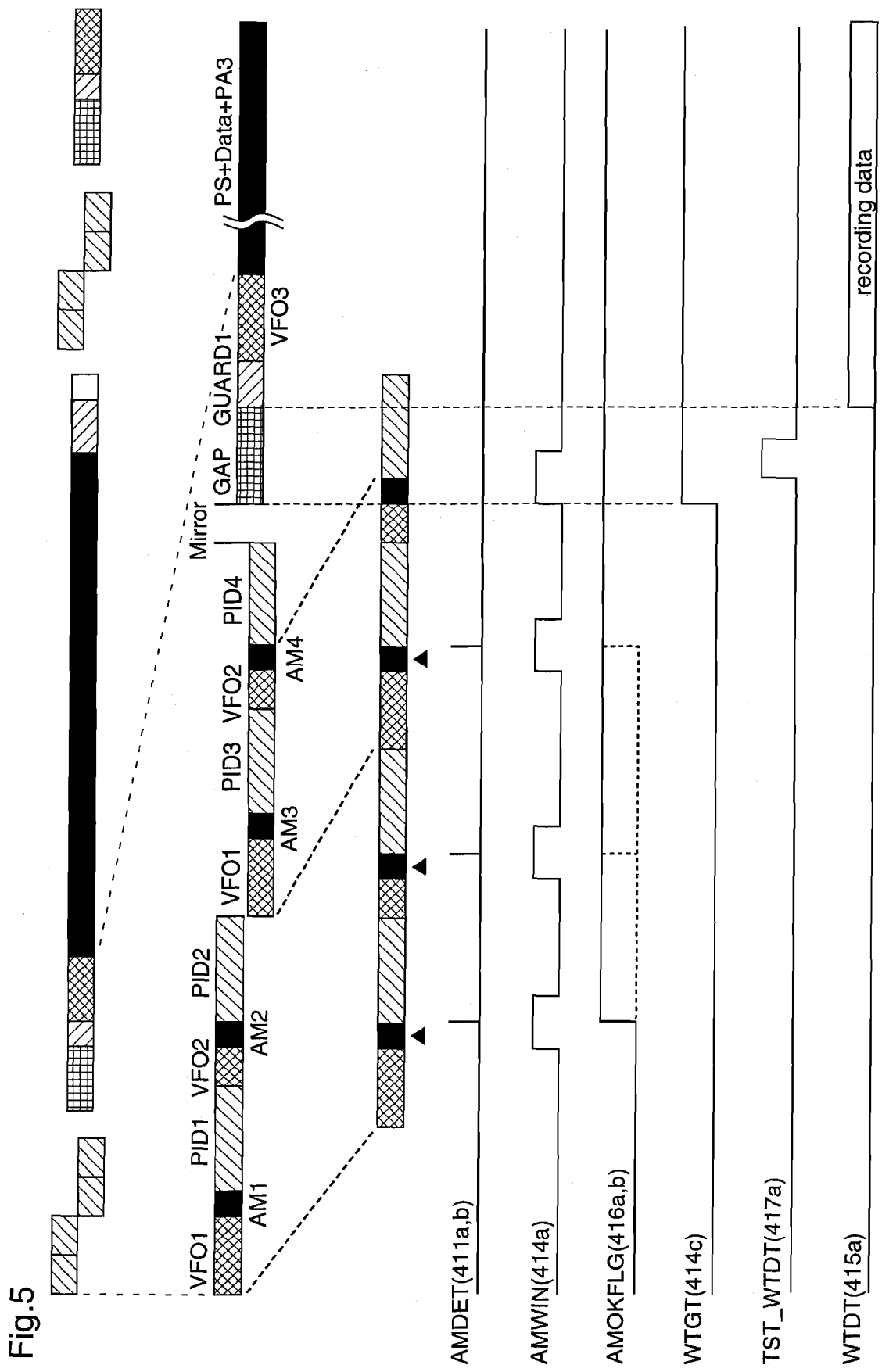
FIG. 5 is a timing chart illustrating a flow in a case where any of the first to third address marks could have been detected in the DVD-RAM decoding in the optical disc recording device 1000 according to the first embodiment of the present invention.
Figure 6:
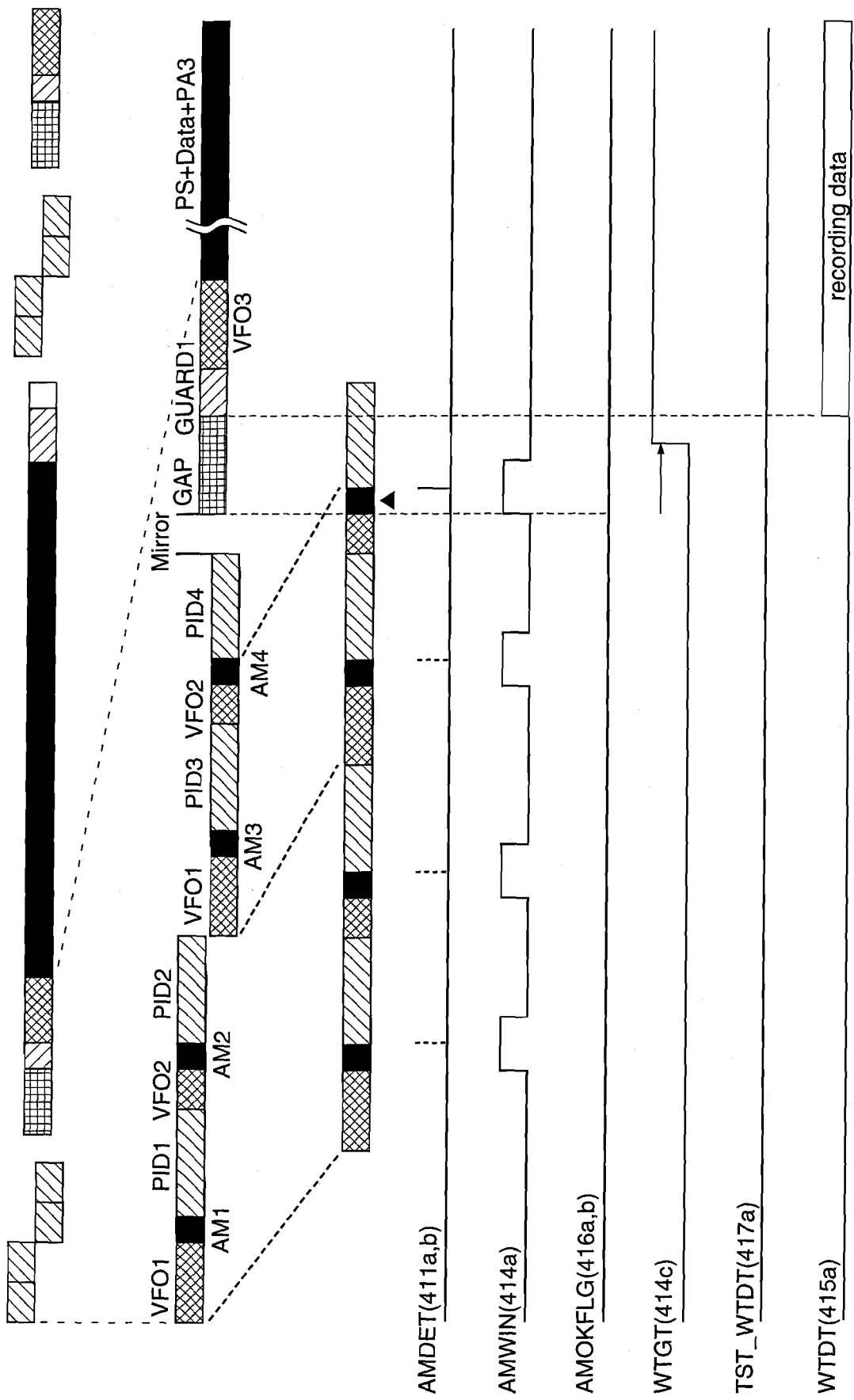
FIG. 6 is a timing chart illustrating a flow in a case where the fourth address mark could have been detected in the DVD-RAM decoding in the optical disc recording device 1000 of the first embodiment of the present invention.

FIGS. 5 and 6 are timing charts for explaining the operation of the optical disc recording device 1000 of this first embodiment. FIG. 5 is a timing chart in a case where any of the first to third address marks AM1 to AM3 could have been detected, and FIG. 4 is a timing chart in a case where only the fourth address mark could have been detected.

The address mark detection situation judging part 416 judges the address mark detection situation of the present sector on the basis of the address mark detection signal AMDET (411a) that is detected by the address mark detection part 411 and the address mark detection window AMWIN (414a) that is generated by the timing generation part 414, and makes the signal AMOKFLG (416a) indicating address mark detection situation "1" when any of the address marks AM1 to AM3 could have been detected, and makes the signal AMOKFLG (416a) indicating address mark detection situation "0" when only the address mark AM4 could have been detected or no address mark could have been detected, and outputs the result to the test data generating part 417.

Here, the address mark detection window AMWIN (414a) is generated with decoding the value of the sector synchronous counter which is corrected by the address mark detection signal AMDET (411b) or the address detection signal (when there is no error), by the timing generating part 414, similarly as in patent document 1.

While the signal WTGT (414c) indicating the data recording position is generated in the timing generating part 414 with decoding the value of the sector synchronous counter similarly as for the address mark detection window AMWIN (414a), the WTGT signal (414c) which indicates the recording position is outputted from the vicinity of the top of the GAP section that is a region for performing the test light emission when the address mark detection situation signal AMOKFLG (416a) which is outputted from the address mark detection situation judging part 416b is "1", and is applied to the laser driving part 408.

On the other hand, when the AMOKFLG(416b) is "0", the timing generating part 414 outputs the WTGT signal (414c) indicating the above-described recording position from the vicinity of the top of GUARD1 region at which the normal recording is carried out by changing the decoded value of the sector synchronous counter which determines the rising position of the above-described WTGT signal (414c).

As for the TST_WTDT (417a) which is outputted from the test recording data generation part 417, when the address mark detection situation signal AMOKFLG (416a) outputted from the address mark detection situation judging part 416 is "1", for example, the test recording data TST_WTDT (417a) for test light emission that is previously determined by a setting means such as the system controller 410 shown in FIG. 4 is outputted to the position that is determined by the setting means using the timing signal (414b) which is outputted with the sector synchronous counter value in the timing generating part 414 being decoded in the timing generating part 414, similarly as the above-described WTGT signal (414c) indicating the data recording position.

On the other hand, the test recording data generating part 417 outputs no signal when the AMOKFLG (416a) is "0".

According to the optical disc recording device 1000 of the first embodiment, when, in a case of performing recording in DVD-RAM, it may be possible that the delay time in reproduced data increases, thereby making the fourth address mark incapable of being detected up to the top of the GAP section, the AMOKFLG is made "1" from the judgment of the address mark detection situation at present in the address mark detection situation judging part 416 when any of the first to third address marks could have been detected, and thereby the normal data recording can be carried out from GUARD1 region after the GAP section test light emission is carried out similarly as in the conventional.

Further, when only the fourth address mark could have been detected, the AMOKFLG is made "0" from the judgment of the address mark detection situation at present in the address mark detection situation judging part 416, and the normal data recording is carried out from GUARD1 region without carrying out a test light emission at the GAP section.

Therefore, if even one among the four address marks could have been detected, the normal data recording can be carried out, and thereby there arises no cases where the probability that the recording become faulty would increase as in the conventional.

Further, in the first embodiment, though it would become impossible to carry out a control of a laser power for each sector at the top of the sector to be recorded, the laser characteristics would not vary during a period of several sectors and this may not cause deteriorations in the recording efficiency, and thereby the recording in DVD-RAM can be securely carried out.

Second Embodiment

An optical disc recording device according to a second embodiment of the preset invention will be described.

A construction of the optical disc recording device 2000 of this second embodiment is the same as that of the first embodiment. This second embodiment carries out a test light emission and the normal recording when any of the first to the third address marks could be read, while carries out the normal recording after carrying out a test light emission with delaying the same when only the fourth address mark AM4 could have been read.

In the construction shown in FIG. 4, the constitutional elements from the optical disc 401 to the modulation part 415 are the same as the constitutional elements from the optical disc 301 to the modulation part 315 in the optical disc device 300 that is disclosed in patent document 1, and the address mark detection situation judging part 416 judges the address mark detection situation at present from the address mark detection signal 411*a* that is detected by the address mark detection part 411 and the address mark detection window 414*a* that is generated by the timing generating part 414, and outputs the signal 416*a* indicating the address mark detection situation. The test recording data generating part 417 determines the test light emission region by the timing signal 414*b* that is outputted from the timing signal generating part 414, determines whether the test recording data is to be delayed or not dependent on the address mark detection situation 416*a* that is outputted from the address mark detection situation judging part 416, and outputs the test recording data 417*a* to the laser driving part 408.

Further, the address mark detecting part 411 outputs the address mark detection signal 411*b* to the timing generating part 414, and the address mark detection judging part 416 outputs the address mark detection situation signal 416*b* to the timing generating part 414. Further, the timing generating part 414 outputs the data 414*d* from the address error detecting part 413 to the modulation part 415, and further outputs the WTGT signal (414*c*) indicating the data recording position to the laser driving part 408.

An operation of the optical disc recording device 2000 of this second embodiment will be described for a case where the optical disc is a DVD-RAM.

Figure 7:
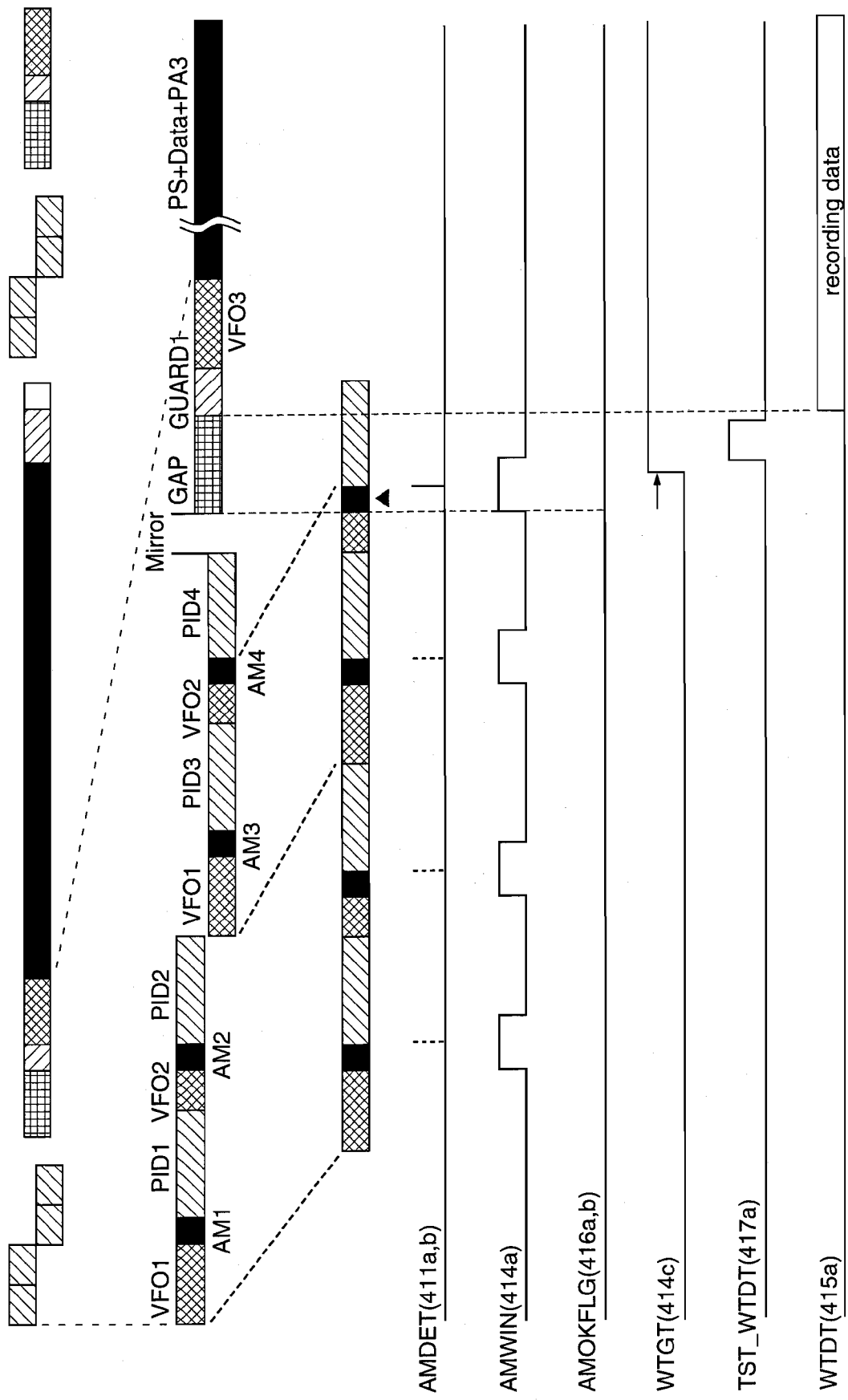
FIG. 7 is a timing chart illustrating a flow in a case where any of the first to third address marks could have been detected in the DVD-RAM recording in the optical disc recording device 2000 of the second embodiment of the present invention.

FIGS. 5 and 7 are timing charts illustrating the operation of the optical disc recording device 2000 of this second embodiment. FIG. 5 is a timing chart in a case where any of the first to third address marks could have been detected, which is common also for the second embodiment and the first embodiment, and FIG. 7 is a timing chart in a case where only the fourth address mark could have been detected.

In this second embodiment, the address mark detection situation judging part 416 judges the address mark detection situation for the present sector using the address mark detection signal ADMET (411*a*) which is outputted from the address mark detection part 411 and the address mark detection window AMWIN (414*a*) which is outputted from the timing generation part 414. When any of the first to third address marks AM1 to AM3 could have been detected, the address mark detection situation signal AMOKFLG (416*a*) is made "1", while when only the fourth address mark AM4 could have been detected or when no address mark could have been detected, the address mark detection situation signal AMOKFLG (416*a*) is made "0", and these signals are respectively outputted.

Here, the address mark detection window AMWIN (414*a*) is generated with the value of the sector synchronous counter which is corrected by the address mark detection signal AMDET (411*b*) or the address detection signal (when there is no error) being decoded in the timing generating part 414, similarly as in patent document 1 shown in FIG. 3.

Here, the WTGT signal (414*c*) indicating the data recording position is generated in the timing generating part 414 with the value of the sector synchronous counter being decoded, similarly for the address mark detection window AMWIN (414*a*). The WTGT signal (414*c*) is outputted from the vicinity of the top of the GAP section that is a region for performing the test light emission when the address mark detection situation signal AMOKFLG (416*a*) which is outputted from the address mark detection situation judging part 416*b* is "1".

On the other hand, when the AMOKFLG (416*b*) is "0", the timing generating part 414 outputs the above-described WTGT signal (414*c*) with delaying the same with relative to a case where the AMOKFLG (416*b*) is "1" by changing the decoded value of the sector synchronous counter which determines the rising position of the WTGT signal (414*c*) to, for example, a value that is previously determined by the setting means such as the system controller 410 shown in FIG. 4.

As for the TST_WTDT (417*a*) that is outputted from the test recording data generation part 417, when the address mark detection situation signal AMOKFLG (416*a*) which is outputted from the address mark detection situation judging part 416 is "1", the test recording data TST_WTDT (417*a*) for test light emission that is previously determined by a setting means such as the system controller 410 is outputted to the position that is previously determined by the setting means, using the timing signal (414*b*) which is outputted with the sector synchronous counter value in the timing generating part 414 being decoded, similarly as for the WTGT signal (414*c*).

When the AMOKFLG (416*a*) is "0", the TST_WTDT (417*a*) is outputted with the output position being delayed with relative to a case where AMOKFLG is "1" by that the decoded value of the sector synchronous counter is changed to the value that is previously determined by the setting means.

According to the optical disc recording device 2000 of this second embodiment, even when, in a case of performing recording in DVD-RAM, it may be possible that the delay time in reproduced data increases, thereby making the fourth address mark being unable to be detected up to the top of the GAP section, the AMOKFLG is made "1" from the judgment of the address mark detection situation at present in the address mark detection situation judging part 416 when any of the first to third address marks could have been detected, and thereby, the normal data recording is carried out from GUARD1 region after performing the GAP section test light emission similarly as in the conventional. On the other hand, when only the fourth address mark could have been detected, the address mark detection situation at present is judged in the address mark detection situation judging part 416 thereby to make AMOKFLG "0", and thereby the normal data recording is carried out from the GUARD1 region after the test light emission is carried out with delayed with relative to the position where the normal outputting at the GAP position is performed. Thereby, a device which enables recording in DVD-RAM with the performance that is equivalent to the conventional device can be obtained.

Third Embodiment

An optical disc recording device according to a third embodiment of the present invention will be described.

Figure 8:
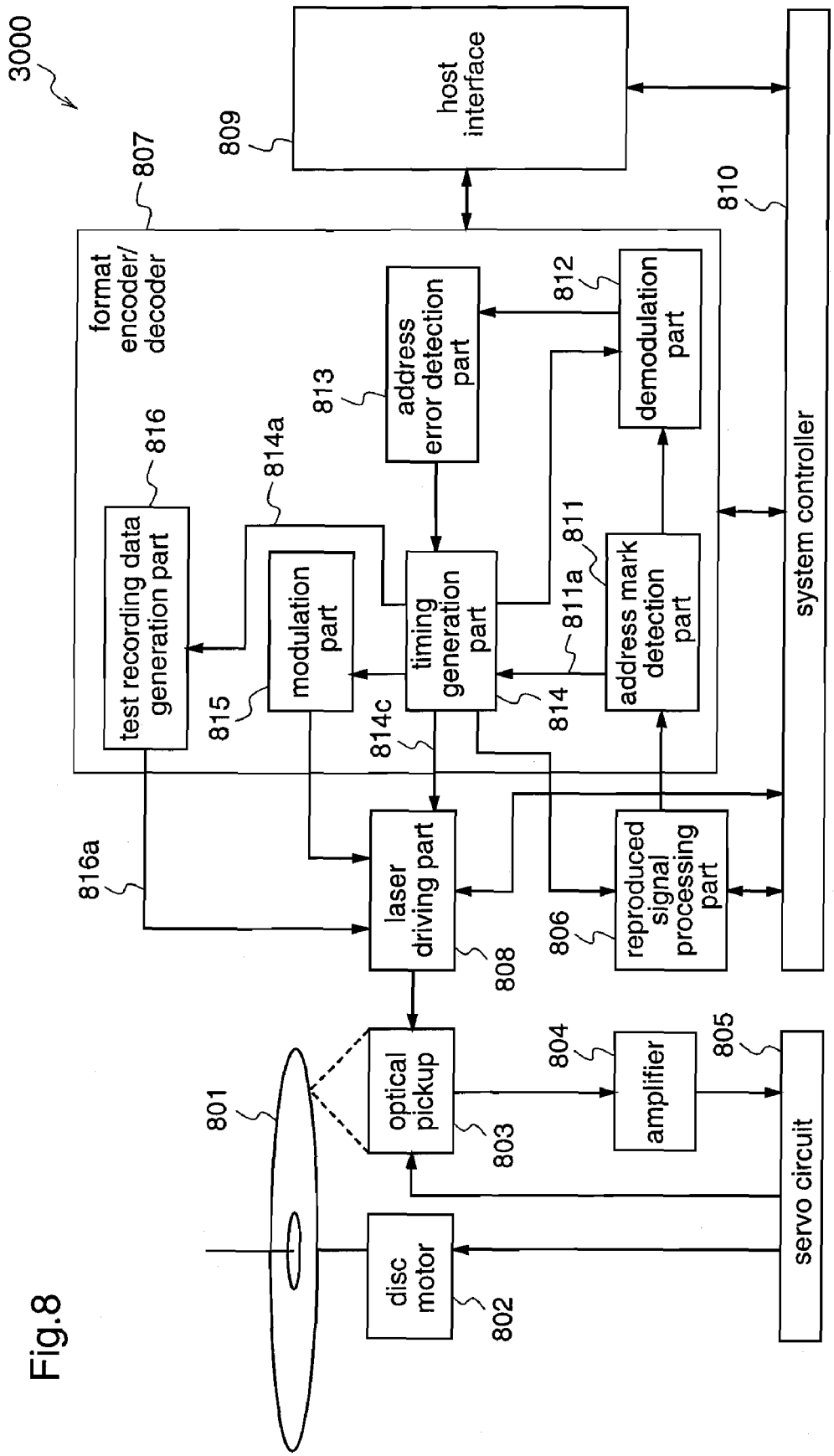
FIG. 8 is a block diagram illustrating a construction of an optical disc recording device 3000 of the third embodiment of the present invention.

FIG. 8 is a diagram illustrating a construction of the optical disc recording device 3000 of this third embodiment. This optical disc recording device 3000 of the third embodiment is constructed so as to keep the width of the test light emission at constant without dependent on the linear velocity.

The respective constitutional elements from the optical disc 801 to the modulation part 815 in the third embodiment shown in FIG. 8 are the same as those in the optical disc device 1300 in patent document 1 shown in FIG. 3.

In this third embodiment, the test recording data generating part 816 determines the test light emission region by the timing signal 814a that is outputted from the timing generation part 814. For example, it outputs the test recording data 816a having a width that is previously determined by the setting means such as the system controller 810 shown in FIG. 8 to the laser driving control part 808.

Further, the timing generating part 814 outputs the WTGT signal (814c) indicating the data recording position to the laser driving part 808.

An operation of the optical disc recording device 3000 according to this third embodiment will be described for a case where the optical disc is a DVD-RAM.

Figure 9:
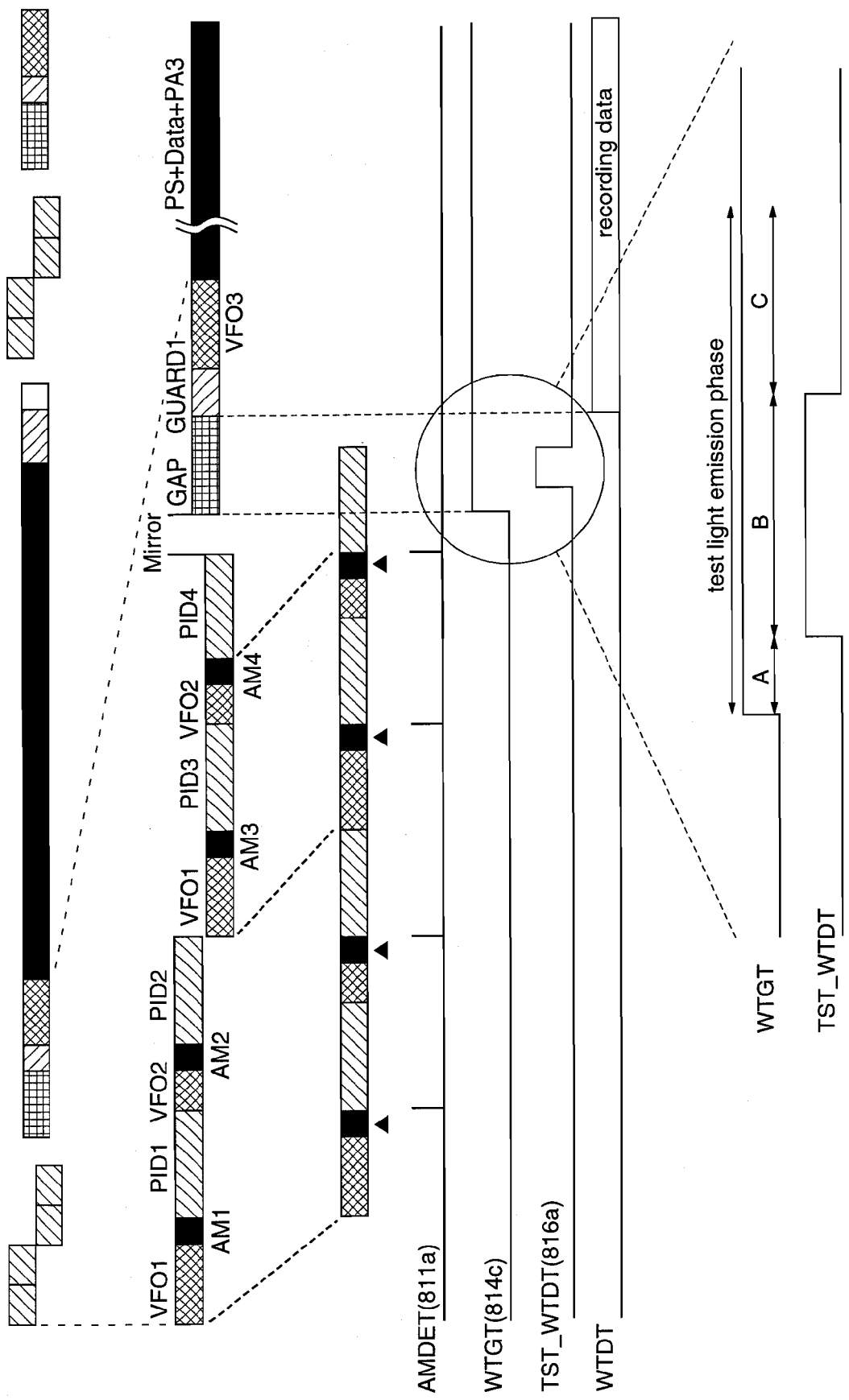
FIG. 9 is a timing chart illustrating a flow of DVD-RAM recording in the optical disc recording device 3000 of the third embodiment of the present invention.

FIG. 9 is a timing chart illustrating the operation of the optical disc recording device 3000 of this third embodiment.

The TST_WTDT (816a) that is outputted from the test recording data generation part 816 determines the test light emission region according to the timing signal 814a which is outputted from the timing generating part 814 with the value of the sector synchronous counter being decoded. Further, it outputs the test recording data (816a) in accordance with the time widths A, B, and C which are determined by the set values a, b, and c which are previously set by the setting means such as a system controller and linear velocities (A, B, and C are, respectively, set value a×linear velocity following clock frequency, set value b×linear velocity following clock frequency, and set value c×linear velocity following clock frequency).

The sector synchronous counter in the timing generation part 814 is a counter whose counter value is corrected according to the address mark detection signal AMDET (811a) and an address detection signal (when there is no error), similarly as in patent document 1.

In this third embodiment, it is constituted such that the time widths of the test recording data A, B, and C are determined by preset values and the linear velocity, respectively. For example, the values V proportional to the linear velocity at present are acquired at constant intervals, and operations corresponding to $a = \alpha \cdot A \cdot V$ $b = \alpha \cdot B \cdot V$ $c = \alpha \cdot C \cdot V$ are carried out (where α is a constant), and set values a, b, and c which are close to the time widths which are desired to be outputted are obtained and set. Thereby, it is possible to accomplish a laser power learning at approximately same precisions even in performing recording with a non-constant linear velocity in such as CAV recording.

Herein, in place of obtaining the value V proportional to the linear velocity, it is possible to obtain a value T that is reversely proportional to the linear velocity, and perform operations according to $a = \alpha \cdot A / T$ $b = \alpha \cdot B / T$ $c = \alpha \cdot C / T$ thereby to obtain values a, b, and c.

While in the above-described third embodiment, as clocks to be used in generating the test recording data, clocks that follow the linear velocity are employed, and the generation of the test recording data may be carried out with employing fixed clocks which do not follow the linear velocity. In this case, it is possible to obtain the effects intended in this third embodiment without changing the set value with relative to the linear velocity.

According to the optical disc recording device 3000 of this third embodiment, the test recording data generation part 816 determines the test light emission region dependent on the timing signal 814a that is outputted from the timing generating part 814, and outputs the test recording data 816a with a width that is, for example, previously determined by the setting means such as the system controller 810 shown in FIG. 8 to the laser driving control part 808, and the TST_WTDT (816a) signal which is outputted from the test recording data generating part 816 is outputted as the test recording data 816a, with the test light emission region being determined by the timing signals which are outputted from the timing generating part 814 with the value of the sector synchronous counter being decoded, as well as with having time widths A, B, and C which are determined by set values a, b, and c previously determined by setting means such as the system controller and the linear velocity, and the sector synchronous counter provided inside the timing generating part 814 corrects the counter value by the address mark detection signal AMDET (811a) and the address detection signal (when there is no error), and the time widths A, B, and C of the test recording data are determined on the basis of the set values and the linear velocity. Thereby, the laser power learning can always be accomplished at approximately the same precisions even in performing recording with a non-constant linear velocity, such as in CAV recording.

Fourth Embodiment

The construction diagram of an optical disc recording device 4000 according to a fourth embodiment of the present invention is the same as that for the optical disc recording device 1000, 2000 of the first and the second embodiments shown in FIG. 4. This fourth embodiment is constructed such that the correction of the counter which indicates the position in the sector is not carried out in the fourth address mark AM4 when any of the address marks AM1 to AM3 could have been detected.

As described, the respective constitutional elements from the optical disc 401 to the modulation part 415 shown in FIG. 4 are the same as the constitutional elements from the optical disc 301 to the modulation part 315 in the optical disc device 1300 shown in FIG. 3, as disclosed in patent document 1.

The address mark detection situation judging part 416 judges the address mark detection situation of the present sector on the basis of the address mark detection signal 411a which is detected by the address mark detection part 411 and the address mark detection window 414a which is generated by the timing generation part 414, and determines whether the address mark detection signal that is outputted from the address mark detection part 411 to the timing generating part 414 is to be masked, and the signal after the address mark detection masking is performed is outputted to the timing generation part 414.

Further, the test recording data generating part 417 generates the test recording data 417a with making a timing signal as a reference, which timing signal is outputted from the timing generating part 414 with employing a sector synchronous counter and decoding the counter value, as similarly in patent document 1.

An operation of the optical disc recording device 4000 according to this fourth embodiment will be described for a case where the optical disc is a DVD-RAM.

Figure 10:
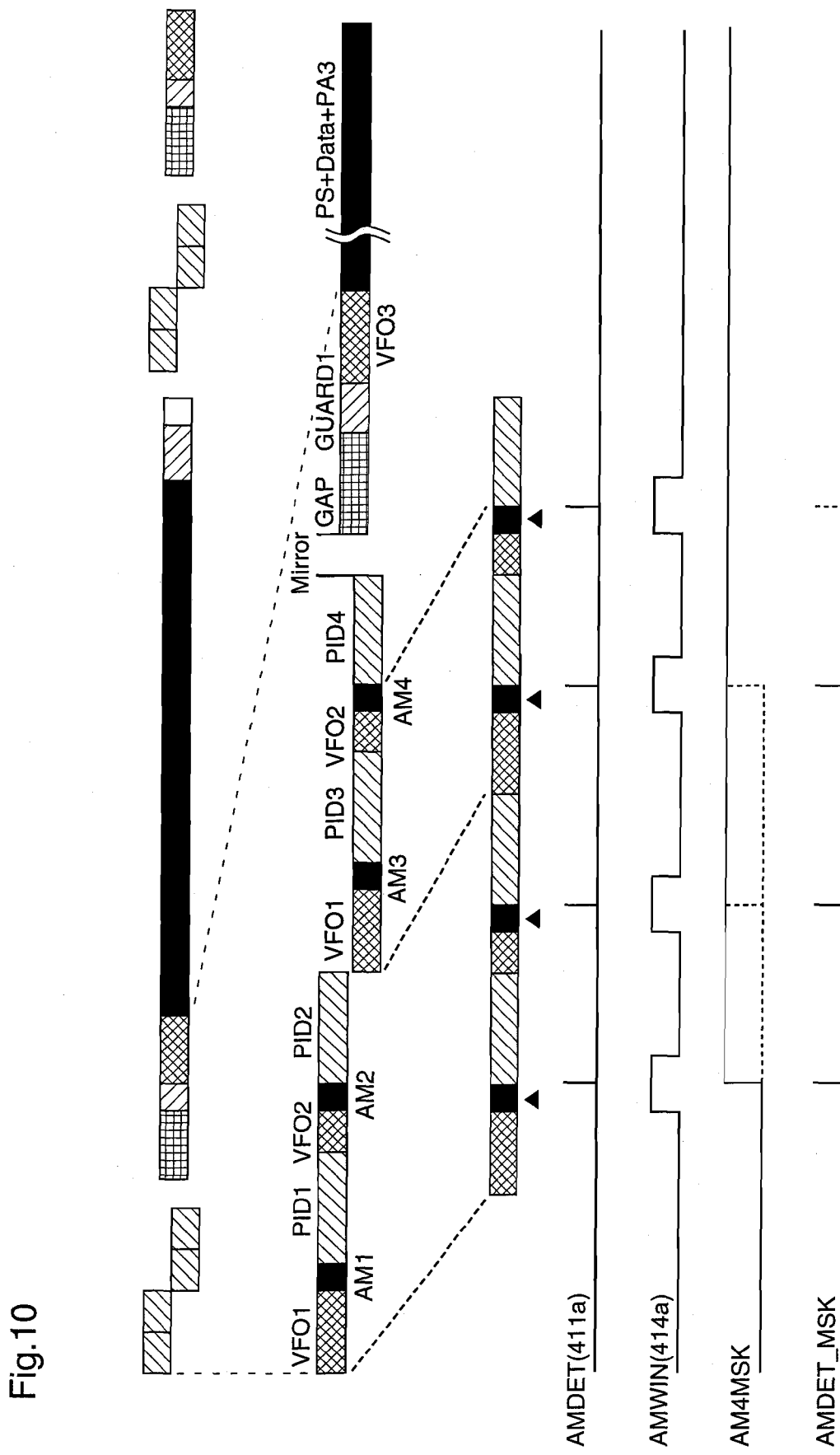
FIG. 10 is a timing chart illustrating a flow in a case where any of the first to third address marks could have been detected in the DVD-RAM recording in the optical disc recording device 4000 of the fourth embodiment of the present invention.
Figure 11:
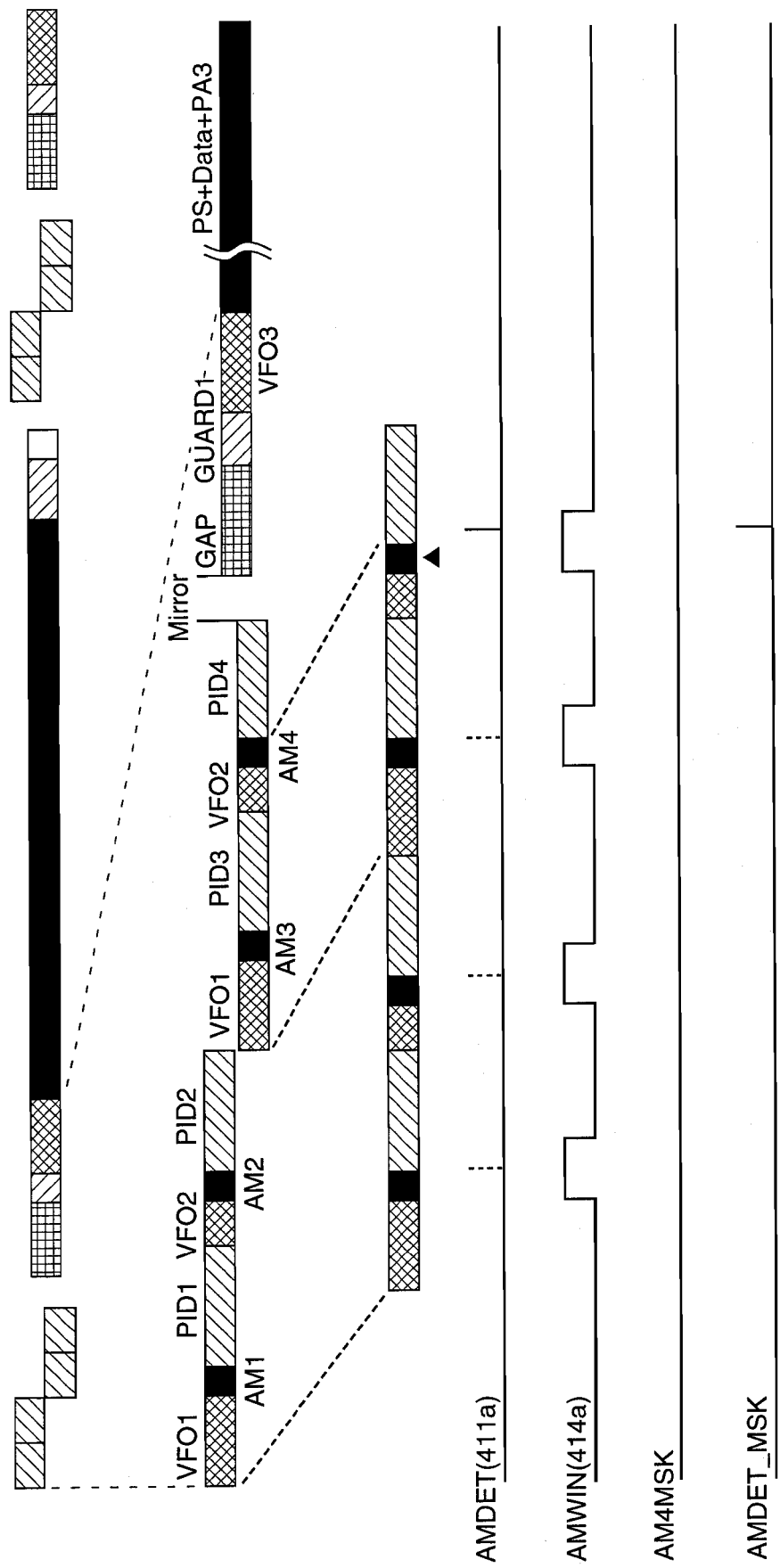
FIG. 11 is a timing chart illustrating a flow in a case where only the fourth address mark could have been detected in the DVD-RAM recording in the optical disc recording device 4000 of the fourth embodiment of the present invention.

FIG. 10 and FIG. 11 are timing charts illustrating the operation of the optical disc recording device 4000 of this fourth embodiment, and FIG. 10 is a timing chart in a case where any of the first to third address marks could have been detected, and FIG. 11 is a timing chart in a case where only the fourth address mark could have been detected.

When any of the first to third address marks could have been detected, the AM4MSK signal which masks the AMDET signal (411b) that is outputted when the fourth address mark is detected is made "1" as shown in FIG. 10, and when the only the fourth address mark could have been detected or when no address mark could have been detected, the AM4MSK signal is made "0", and the signal AMDET MSK that is obtained by the AMDET signal (411b) being masked by the signal that is cleared in the vicinity of the sector conclusion is outputted to the timing generating part 414.

Further, a construction adopted in which the AM4MSK signal is always masked irregardless of the detection situation of the first to the third address marks by that the AM4MSK signal is always made "1" by a setting means such as a system controller 410 shown in FIG. 4.

In the fourth embodiment as above, when, in a case of performing recording in DVD-RAM, the delay time in reproduced data should increase thereby to make the fourth address mark incapable of being detected up to the top of the GAP section, if the test light emission as in the first embodiment is performed using the sector synchronous counter that is corrected on the basis of the address mark detection timing from the top of the GAP section as is conventional, there arises a situation where the counter serving as a reference is corrected by the detection of the fourth address mark during when the test light emission is being carried out. This results in incapability in performing a presumed test light emission correctly. More specifically, there may occur a case where the test light emission period becomes different from the set period, or a case where the pulses for test light emission are lacking.

However, in this fourth embodiment, when any of the first to third address marks could have been detected, correction of the sector synchronous counter serving as a reference, which was usually performed in response to the detection of the fourth address mark, is not carried out. Therefore, there arises no abnormal state as described above in the period of the test light emission, and thereby a correct test light emission can be carried out.

Fifth Embodiment

Figure 12:
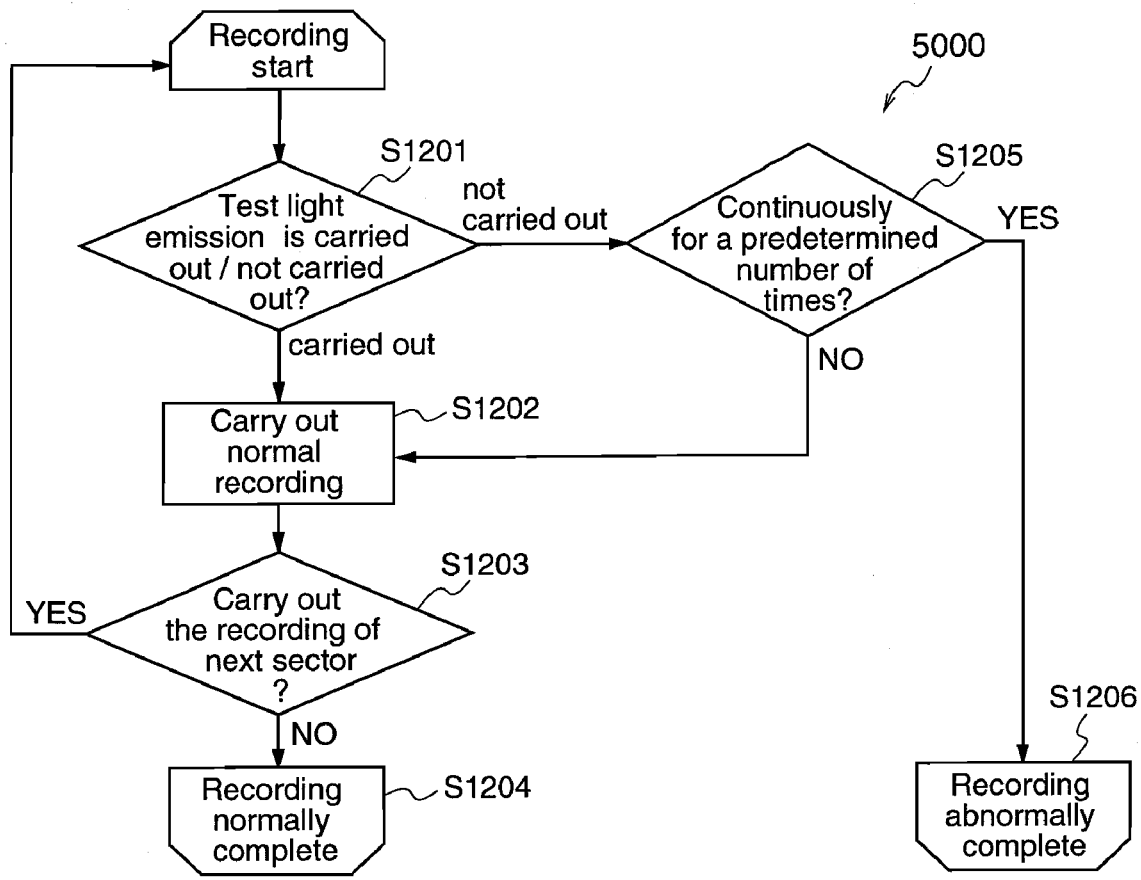
FIG. 12 is a flow chart illustrating a flow in the optical disc recording system 5000 of the fifth embodiment of the present invention.

FIG. 12 is a flowchart illustrating the operation flow of an optical disc recording system 5000 according to a fifth embodiment of the present invention. The optical disc recording system 5000 of this fifth embodiment is operated to abnormally conclude the recording when the test light emission cannot be carried out successively.

An operation of the optical disc recording system 5000 of this fifth embodiment will be described for a case where the optical disc is a DVD-RAM.

The recording is started, and first of all, it is judged as to whether the test light emission is carried out at the GAP section or not (Step S1201).

If the test light emission is carried out correctly, the normal recording is carried out as it is (Step S1202).

Thereafter, since the DVD-RAM recording is of sector completion, it is determined as to whether recording of the next sector is further to be carried out or not (Step S1203), and when the recording is to be carried out successively, it returns to the top of the flowchart shown in FIG. 12 (the step before step S1201), and when the recording is not to be carried out, the recording is normally completed (step S1204).

When the test light emission have not been carried out at the GAP section, it is judged as to whether the test light emission has not been carried out continuously for above a predetermined number of times (Step S1205), and if the test light emission has not been performed continuously for above a predetermined number of times, the recording is concluded abnormally (Step S1206). When it is not the case, the normal recording is performed similarly as in the case where the test light emission is carried out at the GAP section, and it proceeds to the judgment for the next sector recording (the step prior to the step S1201).

In the optical disc recording device 5000 of this fifth embodiment, the recording is started, first of all, it is judged as to whether the test light emission is carried out at the GAP section or not (Step S1201), and if the test light emission has been carried out correctly, the normal recording is carried out as it is, and thereafter, it is determined as to whether recording of the next sector is further to be carried out or not from that the DVD-RAM recording is of sector completing one, and thereafter, when the recording is to be carried out successively, it returns to the top of the flowchart shown in FIG. 12, and when the recording is not to be performed, the recording is subjected to normal conclusion, and if the test light emission has not been performed at the GAP section, it is judged as to whether the test light emission has been not performed continuously for above a predetermined number of times, and if the test light emission has not been performed continuously for above a predetermined number of times, the recording is abnormally concluded, while when it is not the case, the normal recording is performed similarly as in the case where the test light emission is carried out at the GAP section, and it proceeds to the judgment of the next sector recording (Step S1205).

According to this fifth embodiment, by having the construction as described above (e.g., an optical disc recording system which may not carry out a test light emission according to the address mark detection situation as shown in the first embodiment), it is possible to prevent the system from carrying out recording in DVD-RAM in a state where the control of the laser power could have been carried out correctly.

In addition, the successive non-carrying out number of times to be judged may be determined such that the variations in the laser characteristics fall within the allowable range of the recording quality.

APPLICABILITY IN INDUSTRY

The optical disc recording device according to the present invention can carry out recording without deteriorating the recording performance even when the delay in reproduced data increases in the DVD-RAM recording operation, and it is quite effective in being used in an optical disc recording device.

The invention claimed is:

1. An optical disc recording device in which an optical disc is provided, the optical disc having a sector structure comprising a header region at which address information is previously recorded, and a data recording region for recording data,
  wherein the header region comprises a plurality of address regions,
  wherein the address information comprises an address mark section at which an address mark indicating the start of the address information is recorded and an address section for recording an address, the address information being recorded in each of the plurality of address regions,
  wherein the data recording region comprises a first recorded data non-referring region, a recorded data referring region, and a second recorded data non-referring region, and
  wherein the data is recorded into the data recording region by irradiating laser pulses to the data recording region of the optical disc,
  the optical disc recording device comprising:
  an address mark detecting unit for detecting the address mark recorded in the address mark section of each of the plurality of address regions for a particular sector;
  a data recording determining unit for determining a period for recording data into the data recording region of the particular sector based on a timing of detecting the address mark recorded in each of the plurality of address regions for the particular sector;
  a test light emission pattern generating unit for generating test recording data for determining an irradiation power of the laser pulses; and
  a data recording unit for recording the data into the recorded data referring region,
  wherein it is determined whether or not to output the test recording data to the first recorded data non-referring region according to the timing of detecting the address mark recorded in each of the plurality of address regions for the particular sector.

2. An optical disc recording device as defined in claim 1, wherein
  the optical disc is a DVD-RAM,
  the first recorded data non-referring region is a GAP region,
  the recorded data referring region is a region from a GUARD1 region up to a GUARD2 region, and
  the second recorded data non-referring region is a BUFFER region.

3. An optical disc recording device in which an optical disc is provided, the optical disc including a sector structure comprising an address region at which address information is previously recorded, and a data recording region for recording data,
  wherein the header region comprises a plurality of address regions,
  wherein the address information comprises an address mark section at which an address mark indicating the start of the address information is recorded and an address section for recording an address, the address information being recorded in each of the plurality of address regions,
  wherein the data recording region comprises a first recorded data non-referring region, a recorded data referring region, and a second recorded data non-referring region, and
  wherein the data is recorded into the data recording region by irradiating laser pulses to the data recording region of the optical disc,
  the optical disk recording device comprising:
  an address mark detecting unit for detecting the address mark recorded in the address mark section of each of the plurality of address regions for a particular sector;
  a data recording determining unit for determining a period for recording data into the data recording region of the particular sector based on a timing of detecting the address mark recorded in each of the plurality of address regions for the particular sector;
  a test light emission pattern generating unit for generating test recording data for determining an irradiation power of the laser pulses, the generated test recording data being output to the first recorded data non-referring region; and
  a data recording unit for recording the data into the recorded data referring region,
  wherein an output position of the test recording data to the first recorded data non-referring region is determined according to the timing of detecting the address mark recorded in each of the plurality of address regions for the particular sector.

4. An optical disc recording device as defined in claim 3, wherein
  the test light emission pattern generating means is operable to change the output position of the test recording data based on a setting.

5. An optical disc recording device as defined in claim 4, wherein
  the optical disc is a DVD-RAM,
  the first recorded data non-referring region is a GAP region,
  the recorded data referring region is a region from a GUARD1 region to a GUARD2 region, and
  the second recorded data non-referring region is a BUFFER region.

6. An optical disc recording device as defined in claim 3, wherein
  the optical disc is a DVD-RAM,
  the first recorded data non-referring region is a GAP region,
  the recorded data referring region is a region from a GUARD1 region to a GUARD2 region, and
  the second recorded data non-referring region is a BUFFER region.

7. An optical disc recording device in which an optical disc is provided, the optical disc having a sector structure comprising a header region at which address information is previously recorded, and a data recording region for recording data, wherein the header region comprises a plurality of address regions, wherein the address information comprises an address mark section at which an address mark indicating the start of the address information is recorded, and an address section for recording an address, the address information being recorded in each of the plurality of address regions, wherein the data recording region comprises a first recorded data non-referring region, a recorded data referring region, and a second recorded data non-referring region, and wherein the data is recorded into the data recording region by irradiating laser pulses to the data recording region of the optical disc, the optical disc recording device comprising:

an address mark detecting unit for detecting the address mark recorded in the address mark section of each of the plurality of address regions for a particular sector;

a data recording determining unit for determining a period for recording data into the data recording region of the particular sector based on a timing of detecting the address mark recorded in each of the plurality of address regions for the particular sector;

a test light emission pattern generating unit for generating test recording data for determining an irradiation power of the laser pulses, the test recording data being output to the first recorded data non-referring region; and a data recording unit for recording the data into the recorded data referring region using a non-constant linear velocity recording method, wherein the test recording data is output to the first recorded data non-referring region such that a width of the test recording data is independent of a linear velocity of the optical disc.

8. An optical disc recording device as defined in claim 7, wherein the optical disc is a DVD-RAM, the first recorded data non-referring region is a GAP region, the recorded data referring region is a region from a GUARD1 region to a GUARD2 region, and the second recorded data non-referring region is a BUFFER region.

9. An optical disc recording device in which an optical disc is provided, the optical disc having a sector structure comprising a header region at which address information is previously recorded, and a data recording region for recording data, wherein the header region comprises a plurality of address regions, wherein the address information comprises an address mark section at which an address mark indicating the start of the address information is recorded, and an address section for recording an address, the address information being recorded in each of the plurality of address regions, wherein the data recording region comprises a first recorded data non-referring region, a recorded data referring region, and a second recorded data non-referring region, and wherein the data is recorded into the data recording region by irradiating laser pulses to the data recording region of the optical disc, and wherein the plurality of address regions includes four address regions, the optical disc recording device comprising:

an address mark detecting unit for detecting the address mark recorded in the address mark section of each of the plurality of address regions for a particular sector;

a data recording determining unit for determining a period for recording data into the data recording region of the particular sector based on a timing of detecting the address mark recorded in each of the plurality of address regions for the particular sector;

a test light emission pattern generating unit for generating test recording data for determining an irradiation power of the laser pulses, the test recording data being output to the first data non-referring region; and a data recording unit for recording the data into the recorded data referring region, wherein the data recording determining unit determines the period for recording the data into the data recording region of the particular sector based on the timing of detecting the address mark in the fourth address region when the address mark in the first address region, the second address region, and the third address region is not detected.

10. An optical disc recording device as defined in claim 9, wherein the data recording determining unit determines the period for recording the data into the data recording region of the particular sector based on either the timing of detecting the address mark in any of the first address region, the second address region, or the third address region.

11. An optical disc recording device as defined in claim 10, wherein the optical disc is a DVD-RAM, the first recorded data non-referring region is a GAP region, the recorded data referring region is a region from a GUARD1 region up to a GUARD2 region, and the second recorded data non-referring region is a BUFFER region.

12. An optical disc recording device as defined in claim 9, wherein the optical disc is a DVD-RAM, the first recorded data non-referring region is a GAP region, the recorded data referring region is a region from a GUARD1 region up to a GUARD2 region, and the second recorded data non-referring region is a BUFFER region.

13. An optical disc recording device in which an optical disc is provided, the optical disc having a sector structure comprising a header region at which address information is previously recorded, and a data recording region for recording data, wherein the header region comprises a plurality of address regions, wherein the address information comprises an address mark section at which an address mark indicating the start of the address information is recorded, and an address section for recording an address, the address information being recorded in each of the plurality of address regions, wherein the data recording region comprises a first recorded data non-referring region, a recorded data referring region, and a second recorded data non-referring region, and wherein the data is recorded into the data recording region by irradiating laser pulses to the data recording region of the optical disc, the optical disc recording device comprising:

an address mark detecting unit for detecting the address mark recorded in the address mark section of each of the plurality of address regions for a particular sector;

a data recording determining unit for determining a period for recording data into the data recording region of the particular sector based on a timing of detecting the address mark recorded in each of the plurality of address regions for the particular sector;

a test light emission pattern generating unit for generating test recording data for determining an irradiation power of the laser pulses; and a data recording unit for recording the data into the recorded data referring region, wherein it is determined whether or not to output the test recording data to the first recorded data non-referring region according to the timing of detecting the address mark recorded in each of the plurality of address regions for the particular sector, and wherein when the test recording data is not outputted a predetermined number of times, recording of the data is halted.

14. An optical disc recording system as defined in claim 13, wherein the optical disc is a DVD-RAM, the first recorded data non-referring region is a GAP region, the recorded data referring region is a region from a GUARD1 region up to a GUARD2 region, and the second recorded data non-referring region is a BUFFER region.

* * * * *